R. H. EDDY.
Lamp.
No. 3,582.
Patented May 10, 1844.
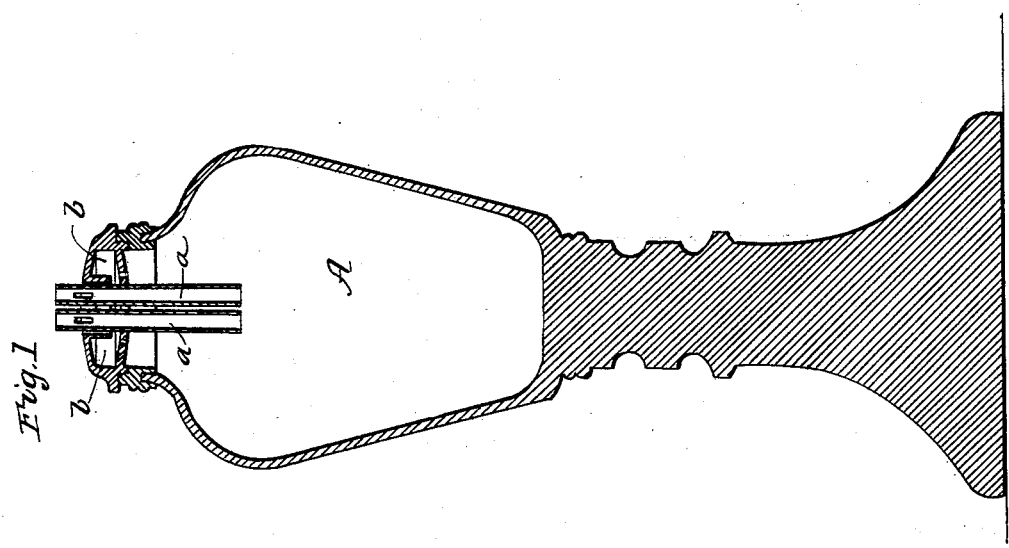
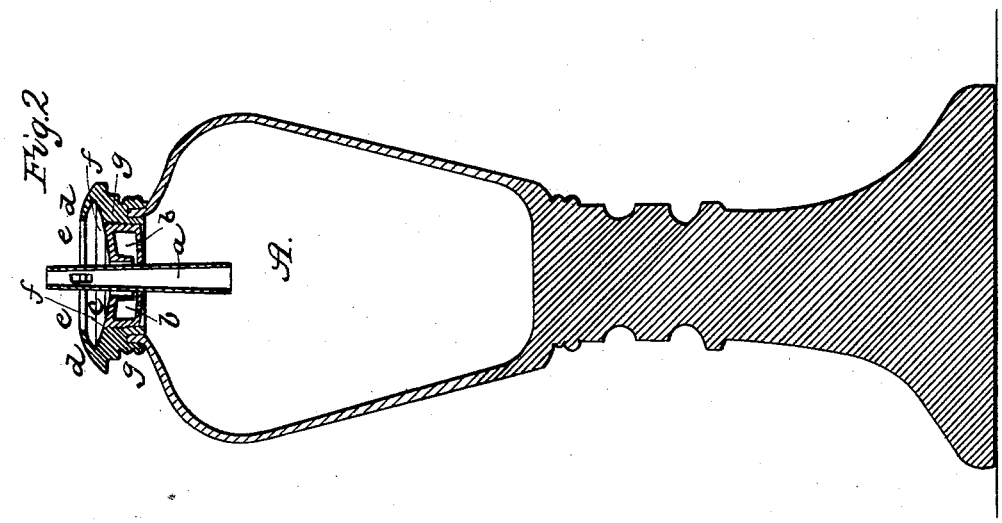

UNITED STATES PATENT OFFICE.

R. H. EDDY, OF BOSTON, MASSACHUSETTS, ASSIGNOR TO D. JARVES AND NEW ENGD. GLASS COMPANY.

LAMP-CAP.

Specification of Letters Patent No. 3,582, dated May 10, 1844.

*To all whom it may concern:*

Be it known that I, ROBERT H. EDDY, of Boston, in the county of Suffolk, in the State of Massachusetts, have invented a certain Improvement in Lamps or Lamp-Caps; my said improvement being peculiarly applicable to the improvement in oil-feeders and other articles of like character for which Letters Patent were granted to Joseph Benson on February 28, A. D. 1844.

The following description and accompanying drawings of my improvement constitute a full and exact specification of the construction and operation of the same.

Having been the legal adviser of the said Benson and assisted him in the preparation of his specification and drawing and in obtaining his Letters Patent, the examination of his invention and my reflections on the same have led me to the conception of the improvement I shall hereinafter describe. Not being desirous owing to circumstances connected with my profession of availing myself of any advantages thereof beyond what I may receive as compensation for preparing the necessary papers, etcetra, for securing the same by Letters Patent and the legal representatives of the said Benson preferring to have the same so protected, and in their possession, I have consented to make application for a patent and to assign all my right, title, and interest in the said invention to and to request the Commissioner of Patents to issue the said letters patent in the names of DEMING JARVES, of Boston, in the county of Suffolk, and the NEW ENGLAND GLASS COMPANY, of East Cambridge, in the State aforesaid, on condition of the said representatives paying the expenses of obtaining the said patent. I make the above preliminary statement in order to exhibit what has led me to the discovery of my said improvement, as well as the cause of a personal application on my part for a patent, and the reason why the proprietorship of my discovery becomes vested in the said JARVES, and the said company, and that my interest in the same both directly and indirectly has ceased.

Among the articles to which the said Benson has adapted his improvement is the common lamp for burning oil.

Figure 1 represents a vertical and central section of a lamp, having the improvements applied to it, $a$, $a$, being the wick tubes whose upper parts are surrounded by a chamber $b$, $b$, such as is described in the specification of the aforesaid Letters Patent of said Benson, as combined with the oil reservoir, and covered at its top and sides, to prevent the oil which runs over and down the sides of the discharging tube, from flowing down upon the outside of the reservoir of the feeder or lamp.

Fig. 2, is a vertical and central section of a lamp, constructed on my improved plan. The covered chamber which prevents the escape of oil is represented at $b$, $b$, and the wick tube at $a$. Directly over and upon this chamber a cup, or receptacle $c$, is arranged, or the top of the chamber, is formed concave as represented in the drawing, in order to collect and retain any carbon which may drop from the inflamed portion of the wick of the lamp, and in order to prevent the carbon from falling out of the cup when the lamp is turned over, or inclined toward a horizontal position. I form around the outer edge of the cup, an inclined lip $d$, $d$, which projects from the said edge, and inclines upward toward the wick tube as seen in the drawing. The inner boundary $e$, $e$, of the said lip should be a circle of a diameter a very little greater than that of the screw $f$, $f$, by which the chamber $b$, $b$, is screwed into the neck or collar $g$, $g$, the same being for the purpose of permitting the chamber to be passed through the opening $e$, $e$, and inserted in the screw of the rack or collar. The main reservoir of the lamp is represented at A, in Figs. 1, 2. By inspection of Fig. 2, it will be perceived that the chamber $b$, $b$, is arranged entirely within the collar $g$, $g$, and that a part of the collar projects above the top of the chamber, and has the inclined lip $d$, $d$, raised upon it. By this arrangement of the parts any oil which, when the lamp is turned down toward a horizontal position, might pass through the screw at $f$, or between the exterior of the chamber and the interior of the collar, where they are in opposition with each other, would be arrested by the lip, $d$, $d$, and prevented from flowing over or running down the sides or exterior of the lamp.

As the lamp described in Fig. 1 is arranged should any oil escape through the screw it would run down the sides of the lamp.

Having thus described my improvement I shall claim,

1. The combination of a cup or receptacle (c, Fig. 2) with the chamber b, b, the object of the said cup being to catch any carbon which may drop from the inflammable portion of the wick. Also the addition to, or combination with the cap, of the inclined lip d, d, surrounding the exterior edge of it, and extending from and above the same substantially as seen in the drawing, the object of the said lip being to prevent any oil, or carbon, that may be in the cup, from running over and dropping upon the outside of the lamp whenever the lamp is turned over into a horizontal or inclined position.

2. Also sinking the chamber b, b, entirely within the collar or neck g, g, in combination with a lip d, d, raised upon the upper edge of the collar, as represented in Fig. 2, the object of such an arrangement being to arrest any oil which may escape through the screw of the lamp cap, or between that formed upon the exterior of the chamber b, b, and the interior of the collar g, g, the whole of the above being constructed, and operating substantially as before specified.

In testimony that the above is a correct specification of my improvement I have hereto set my signature this first day of April, in the year 1844.

ROBERT H. EDDY.

Witnesses:
 JOHN NOBLE,
 CALEB EDDY.